United States Patent
Park et al.

(10) Patent No.: US 11,366,736 B2
(45) Date of Patent: *Jun. 21, 2022

(54) MEMORY SYSTEM USING SRAM WITH FLAG INFORMATION TO IDENTIFY UNMAPPED ADDRESSES

(71) Applicant: SK hynix Inc., Gyeonggi-do (KR)

(72) Inventors: Byeong Gyu Park, Gyeonggi-do (KR); Ik Sung Oh, Gyeonggi-do (KR); Seung Gu Ji, Seoul (KR); Sung Kwan Hong, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 43 days.

This patent is subject to a terminal disclaimer.

(21) Appl. No.: 16/884,240

(22) Filed: May 27, 2020

(65) Prior Publication Data

US 2020/0285552 A1    Sep. 10, 2020

Related U.S. Application Data

(63) Continuation of application No. 16/034,924, filed on Jul. 13, 2018, now Pat. No. 10,698,786.

(30) Foreign Application Priority Data

Nov. 28, 2017   (KR) .................. 10-2017-0160827

(51) Int. Cl.
*G06F 12/00* (2006.01)
*G06F 11/34* (2006.01)
(Continued)

(52) U.S. Cl.
CPC ........ *G06F 11/3419* (2013.01); *G06F 3/0659* (2013.01); *G06F 3/0679* (2013.01);
(Continued)

(58) Field of Classification Search
CPC .. G06F 11/3419; G06F 3/0659; G06F 3/0679; G06F 12/0246; G06F 12/10; G06F 12/1009; G06F 12/1018; G06F 12/1027; G06F 12/1036; G06F 12/1045; G06F 12/1054; G06F 12/1063; G06F 12/1072; G06F 12/1081; G06F 2212/65; G06F 2212/651; G06F 2212/652; G06F 2212/653; G06F 2212/654; G06F 2212/655; G06F 2212/656; G06F 2212/657; G06F 2212/68;
(Continued)

(56) References Cited

U.S. PATENT DOCUMENTS

2008/0005471 A1    1/2008  Ma et al.
2015/0331624 A1*   11/2015 Law .................... G06F 12/0246
                                                              711/103

OTHER PUBLICATIONS

Office Action issued by the Korean Intellectual Property Office dated Jan. 25, 2022.

* cited by examiner

*Primary Examiner* — Arvind Talukdar
(74) *Attorney, Agent, or Firm* — IP & T Group LLP

(57) ABSTRACT

A memory system includes a nonvolatile memory device; a random access memory configured to store, in response to an unmap request received from a host device, a flag information indicating that an unmap address as a target of the unmap request is unmapped; and a control unit configured to flush the flag information to the nonvolatile memory device, wherein the control unit flushes the flag information to the nonvolatile memory device when a first condition is satisfied.

18 Claims, 13 Drawing Sheets

(51) Int. Cl.
*G06F 3/06* (2006.01)
*G06F 12/02* (2006.01)
*G06F 12/10* (2016.01)
*G06F 12/1018* (2016.01)
*G06F 12/1036* (2016.01)
G06F 12/1009 (2016.01)
G06F 12/1027 (2016.01)
G06F 12/1045 (2016.01)
G06F 12/1081 (2016.01)

(52) U.S. Cl.
CPC .......... *G06F 12/0246* (2013.01); *G06F 12/10* (2013.01); *G06F 12/1018* (2013.01); *G06F 12/1036* (2013.01); G06F 12/1009 (2013.01); G06F 12/1027 (2013.01); G06F 12/1045 (2013.01); G06F 12/1054 (2013.01); G06F 12/1081 (2013.01); G06F 2212/65 (2013.01); G06F 2212/657 (2013.01); G06F 2212/68 (2013.01); G06F 2212/683 (2013.01)

(58) Field of Classification Search
CPC ......... G06F 2212/681; G06F 2212/682; G06F 2212/683; G06F 2212/684; G06F 2212/7201
See application file for complete search history.

US 11,366,736 B2

MEMORY SYSTEM USING SRAM WITH FLAG INFORMATION TO IDENTIFY UNMAPPED ADDRESSES

CROSS-REFERENCES TO RELATED APPLICATION

The application is a continuation of U.S. patent application Ser. No. 16/034,924 filed on Jul. 13, 2018, which claims benefits of priority of Korean Patent Application No. 10-2017-0160827 filed on Nov. 28, 2017. The disclosure of each of the foregoing application is incorporated herein by reference in its entirety.

BACKGROUND

1. Technical Field

Various exemplary embodiments of the present invention generally relate to a memory system which uses a nonvolatile memory device as a storage medium.

2. Related Art

A memory system may store the data provided from an external device, in response to a write request from the external device. Also, the memory system may provide stored data to the external device, in response to a read request from the external device. The external device may be an electronic device capable of processing data such as a computer, a digital camera, or a mobile phone. The memory system may be built in the external device, or may be manufactured in a separable form and be coupled to the external device.

Since a memory system using a memory device has no mechanical driving part, some of the advantages may include excellent stability and durability, high information access speed, and low power consumption. Memory systems having such advantages include a universal serial bus (USB) memory device, memory cards having various interfaces, a universal flash storage (UFS) device, and a solid state drive (SSD).

SUMMARY

Various embodiments are directed to a memory system capable of efficiently processing an unmap request and a read request for an unmap address, and an operating method thereof.

In an embodiment, a memory system may include: a nonvolatile memory device; a random access memory configured to store, in response to an unmap request received from a host device, a flag information indicating that an unmap address as a target of the unmap request is unmapped; and a control unit configured to flush the flag information to the nonvolatile memory device, wherein the control unit flushes the flag information to the nonvolatile memory device when a first condition is satisfied.

In an embodiment, a memory system may include: a nonvolatile memory device including a memory unit; a random access memory configured to store a flag information indicating that an address of the memory unit is unmapped; and a control unit configured to transmit, when a read request is received from a host device, a response corresponding to the read request, to the host device, wherein the control unit transmits, when a read request for an unmap address is received from the host device, an unmap response to the host device, by referring to the flag information.

In an embodiment, a method for operating a memory system may include: receiving an unmap request from a host device; storing a flag information indicating that an unmap address as a target of the unmap request is unmapped, in a random access memory; and controlling, by a control unit, the flag information to be flushed to a nonvolatile memory device when a first condition is satisfied.

In an embodiment, a memory system may include: a first storage device; a second storage device suitable for storing a flag information indicating whether a target address is unmapped; and a controller suitable for flushing the flag information from the second storage device to the first storage device and then removing the flag information from the second storage device. The controller provides an unmap response by referring the flag information stored in one of the first and second storage devices.

According to the embodiments, a memory system may efficiently process an unmap request of a host device.

Also, in correspondence to a read request of the host device, the memory system may quickly transmit a requested information for an unmap address.

DETAILED DESCRIPTION

Figure 1:
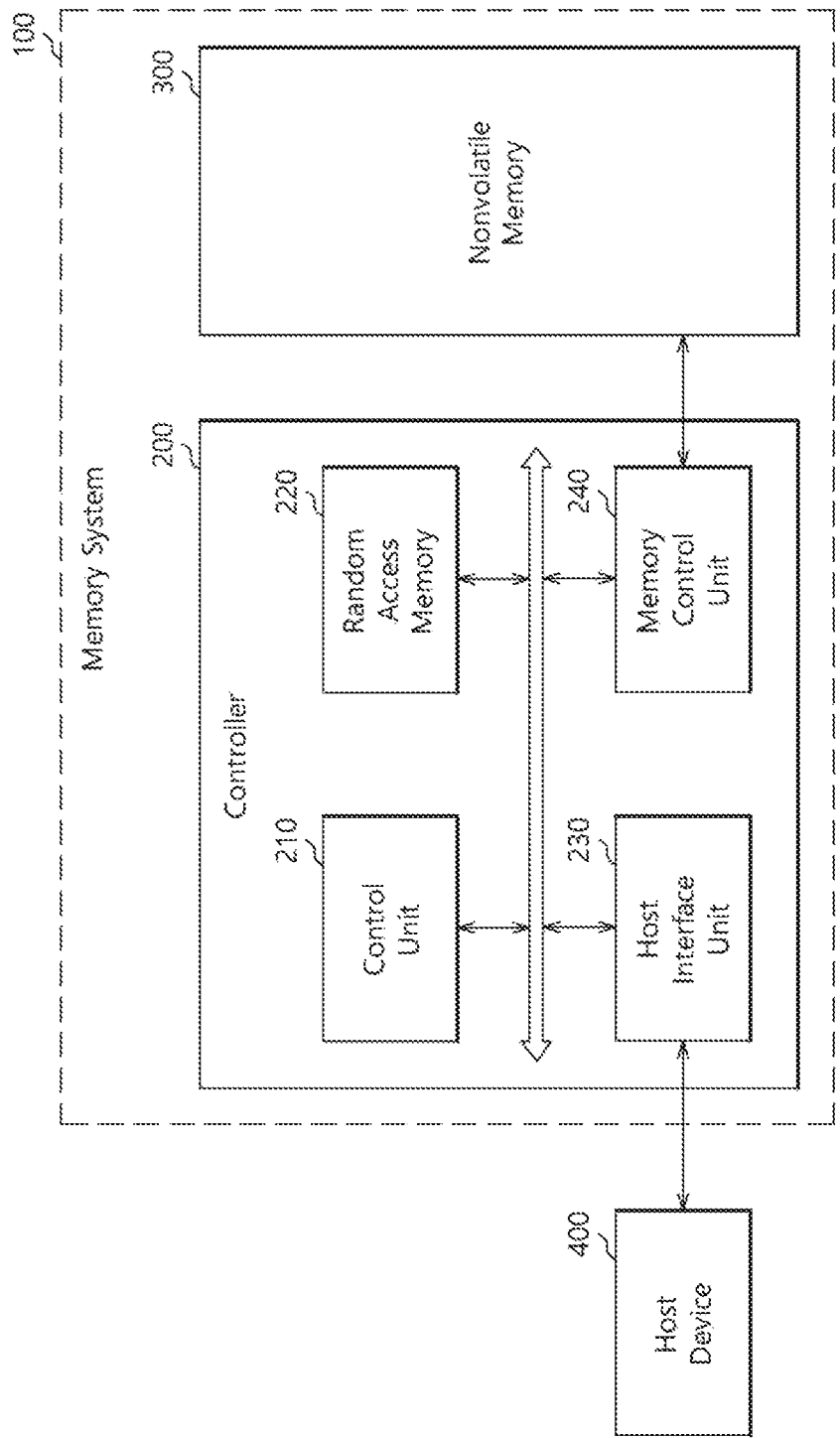
FIG. 1 is a block diagram illustrating a memory system in accordance with an embodiment.

Advantages, features, and methods of the present invention will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concept of the present invention.

It is to be understood herein that embodiments of the present invention are not limited to the particulars shown in the drawings and that the drawings are not necessarily to scale. In some instances, proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a memory system and an operating method thereof will be described below with reference to the accompanying drawings through various examples of embodiments.

FIG. 1 is a block diagram illustrating a memory system 100 in accordance with an embodiment. The memory system 100 may store data to be accessed by a host device 400 such as a mobile phone, an MP3 player, a laptop computer, a desktop computer, a game player, a TV, an in-vehicle infotainment system, and so forth.

The memory system 100 may be manufactured as any one of various kinds of storage devices according to a host interface meaning a transmission protocol with respect to the host device 400. For example, the memory system 100 may be configured as any one of various kinds of storage devices such as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and so forth.

The memory system 100 may be manufactured as any one among various kinds of package types. For example, the memory system 100 may be manufactured as any one of various kinds of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

Referring to FIG. 1, the memory system 100 in accordance with the embodiment may include a controller 200. The controller 200 may include a control unit 210, a random access memory 220, a host interface unit 230, and a memory control unit 240.

The control unit 210 may be configured by a micro control unit (MCU) or a central processing unit (CPU). The control unit 210 may process a request which is transmitted from the host device. In order to process the request, the control unit 210 may drive an instruction or algorithm of a code type, that is, a firmware FW, loaded in the random access memory 220, and may control internal function blocks and a nonvolatile memory device 300.

The random access memory 220 may be configured by a random access memory such as a dynamic random access memory (DRAM) or a static random access memory (SRAM). The random access memory 220 may store the firmware FW which is to be driven by the control unit 210. Also, the random access memory 220 may store data necessary for driving the firmware FW, for example, metadata. That is, the random access memory 220 may operate as the working memory of the control unit 210.

The host interface unit 230 may interface the host device 400 and the memory system 100. For example, the host interface unit 230 may communicate with the host device 400 by using the host interface (HIF), that is, any one among standard transmission protocols such as universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI), and PCI express (PCI-E) protocols.

The memory control unit 240 may control the nonvolatile memory device 300 according to a control of the control unit 210. The memory control unit 240 may also be referred to as a memory interface unit. The memory control unit 240 may provide control signals to the nonvolatile memory device 300. The control signals may include a command, an address, a control signal, and so forth for controlling the nonvolatile memory device 300. The memory control unit 240 may provide data to the nonvolatile memory device 300 or may be provided with data from the nonvolatile memory device 300.

The memory system 100 may include the nonvolatile memory device 300. The nonvolatile memory device 300 may be coupled to the controller 200 through a channel (CH) which includes at least one signal line capable of transmitting a command, an address, control signals, and data. The nonvolatile memory device 300 may be used as the storage medium of the memory system 100.

Figure 2:
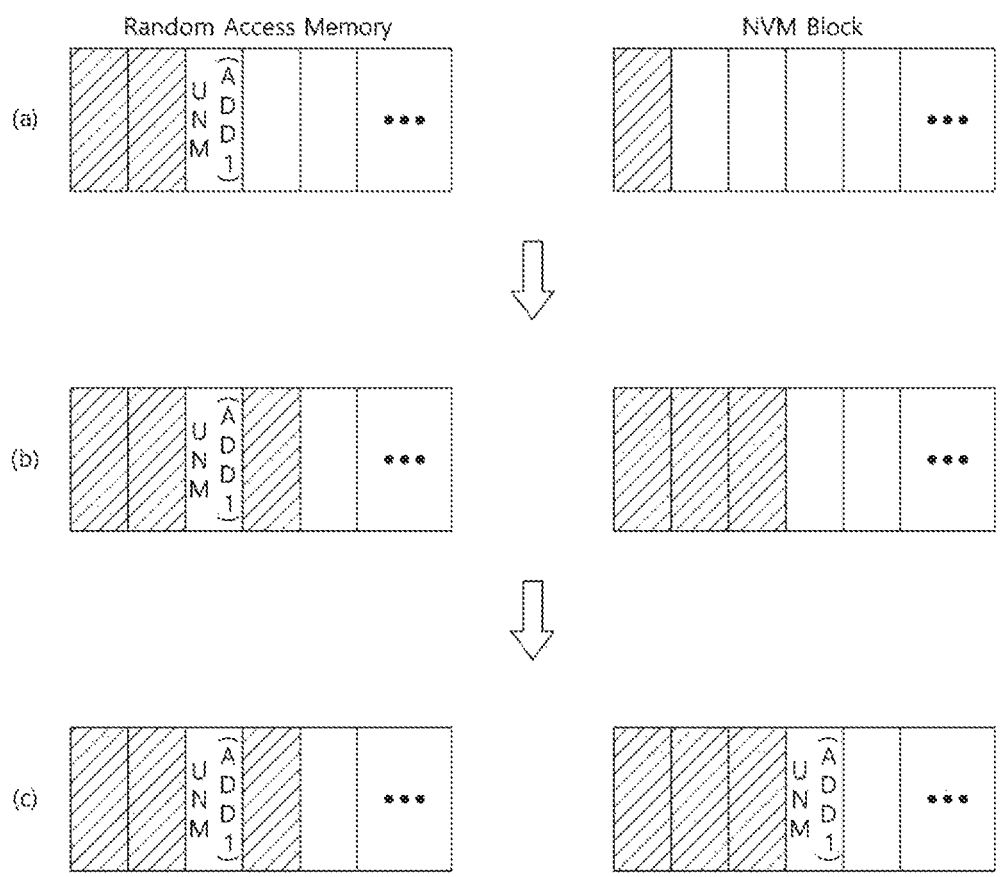
FIGS. 2 and 3 are diagrams describing processes in which a flag information is flushed to a nonvolatile memory device in accordance with the embodiment.
Figure 3:
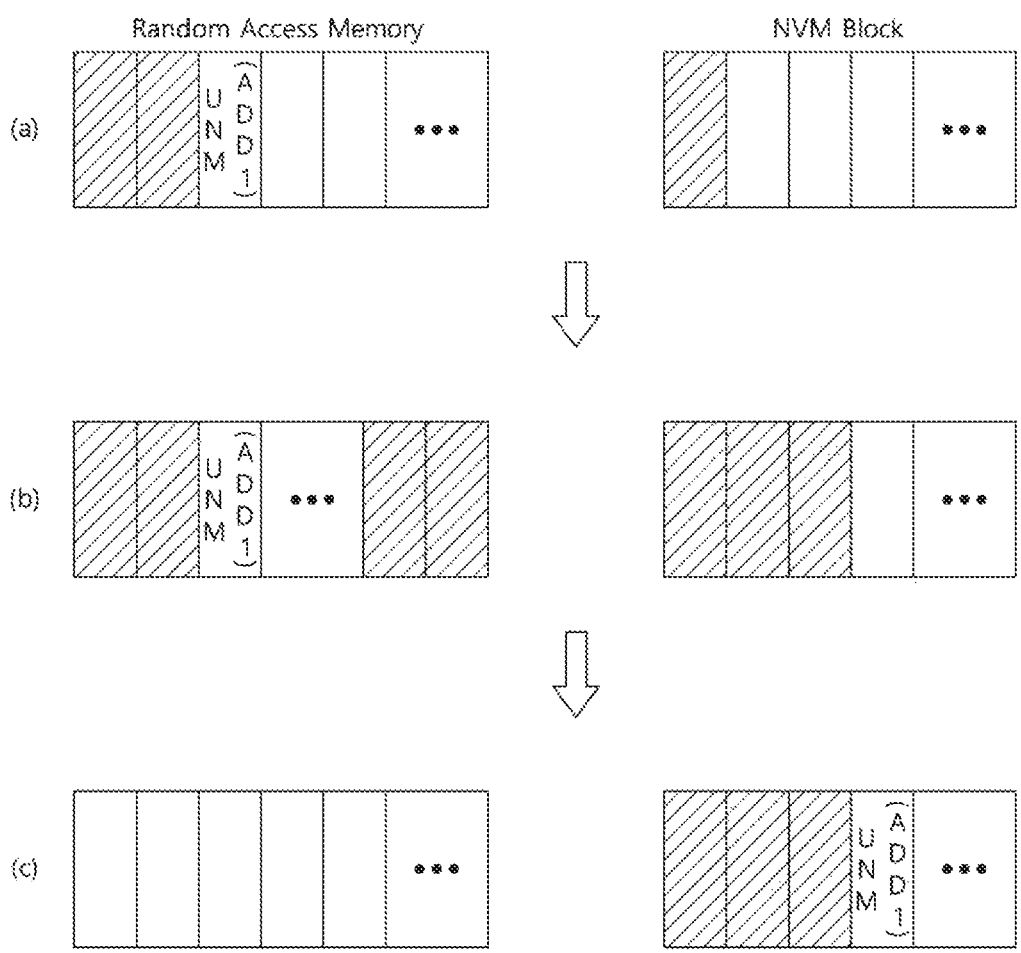

FIGS. 2 and 3 are diagrams describing processes in which a flag information is flushed to a nonvolatile memory device in accordance with the embodiment. The memory system 100 in accordance with the embodiment will be described below with reference to FIGS. 1 to 3.

Since an operation for matching a first mapping information stored in the random access memory 220 with a second mapping information stored in the nonvolatile memory device 300 may include an operation of comparing the first mapping information stored in the random access memory 220 and the second mapping information stored in the nonvolatile memory device 300; an operation of flushing or backing up into the nonvolatile memory device 300 the first mapping information stored in the random access memory 220; and an operation of updating a meta information stored in the random access memory 220 for managing the second mapping information stored in the nonvolatile memory device 300. The meta information may include location information of the second mapping information. It may take a lot of resources and a long time to perform the operation for matching the first and the second mapping informations stored in the random access memory 220 and the nonvolatile memory device 300.

Therefore, the memory system 100 may process an unmap request of the host device 400 in a stepwise manner divided into primary unmap processing and secondary unmap processing. That is, the memory system 100 may preferentially unmap an unmap address in the random access memory 220. Then, the memory system 100 may finally unmap the unmap address in the nonvolatile memory device 300 at a time when it is necessary to update the second mapping information stored in the nonvolatile memory device 300.

The memory system 100 in accordance with the embodiment may include the nonvolatile memory device 300; the random access memory 220 which is configured to store, in response to the unmap request received from the host device 400, a flag information UNM indicating that the unmap address as the target of the unmap request is unmapped; and the control unit 210 which is configured to flush the flag information UNM from the random access memory 220 to the nonvolatile memory device 300.

The control unit 210 may flush the flag information UNM from the random access memory 220 to the nonvolatile memory device 300 when a first condition is satisfied.

A flag information may indicate whether a corresponding address ADD is mapped MP or unmapped UNM. For instance, a flag information which is flagged as mapped MP may mean that a corresponding address ADD is mapped. For another instance, a flag information which is flagged as unmapped UNM may mean that a corresponding address ADD is unmapped.

Referring to FIG. 2, in the memory system 100 in accordance with the embodiment, a flag information UNM may be stored in the random access memory 220 in response to an unmap request for a first address ADD1 received from the host device 400. (denoted as (a) in FIG. 2)

After the flag information UNM is stored in the random access memory 220, data corresponding to another request of the host device 400 may be stored in the random access memory 220. In other words, after the flag information UNM is stored in the random access memory 220, the flag information UNM may not be immediately flushed to the nonvolatile memory device 300. (denoted as (b) in FIG. 2)

After the flag information UNM is stored in the random access memory 220, when a flush request is received from the host device 400, the flag information UNM may be flushed to the nonvolatile memory device 300 from the random access memory 220 by the control of the control unit 210. (denoted as (c) in FIG. 2) Namely, the first condition may be that a flush request is received from the host device 400.

Referring to FIG. 3, in the memory system 100 in accordance with the embodiment, a flag information UNM may be stored in the random access memory 220 in response to an unmap request for a first address ADD1 received from the host device 400. (denoted as (a) in FIG. 3)

After the flag information UNM is stored in the random access memory 220, data corresponding to another request of the host device 400 may be stored in the random access memory 220. (denoted as (b) in FIG. 3)

When the random access memory 220 is full, the flag information UNM may be flushed to the nonvolatile memory device 300 from the random access memory 220 by the control of the control unit 210. Namely, the first condition may be that the random access memory 220 is full. (denoted as (c) in FIG. 3)

After the flag information UNM is flushed to the nonvolatile memory device 300, all data stored in the random access memory 220 may be erased. (denoted as (c) in FIG. 3)

Figure 4:
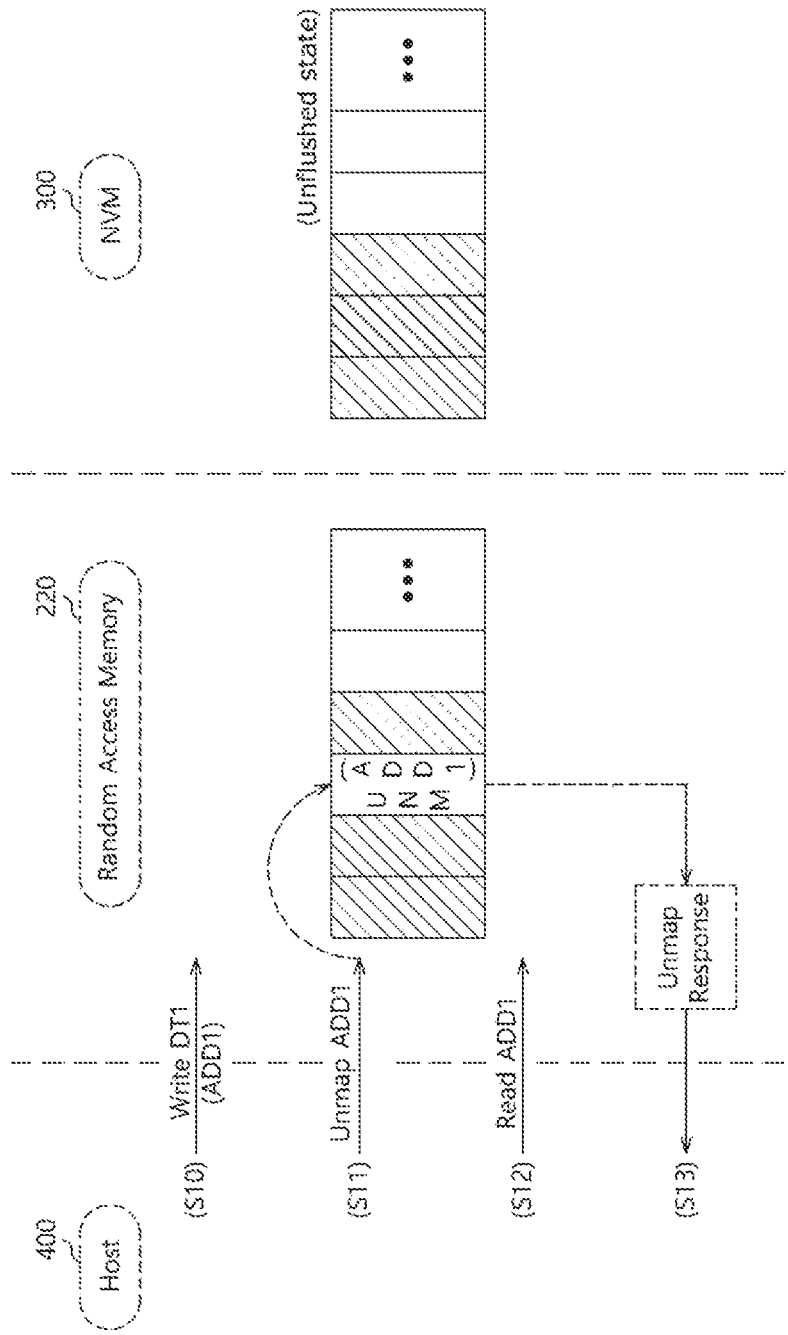
FIGS. 4 to 6 are diagrams describing processes in which the memory system in accordance with the embodiment outputs a response to a request received from a host device.
Figure 5:
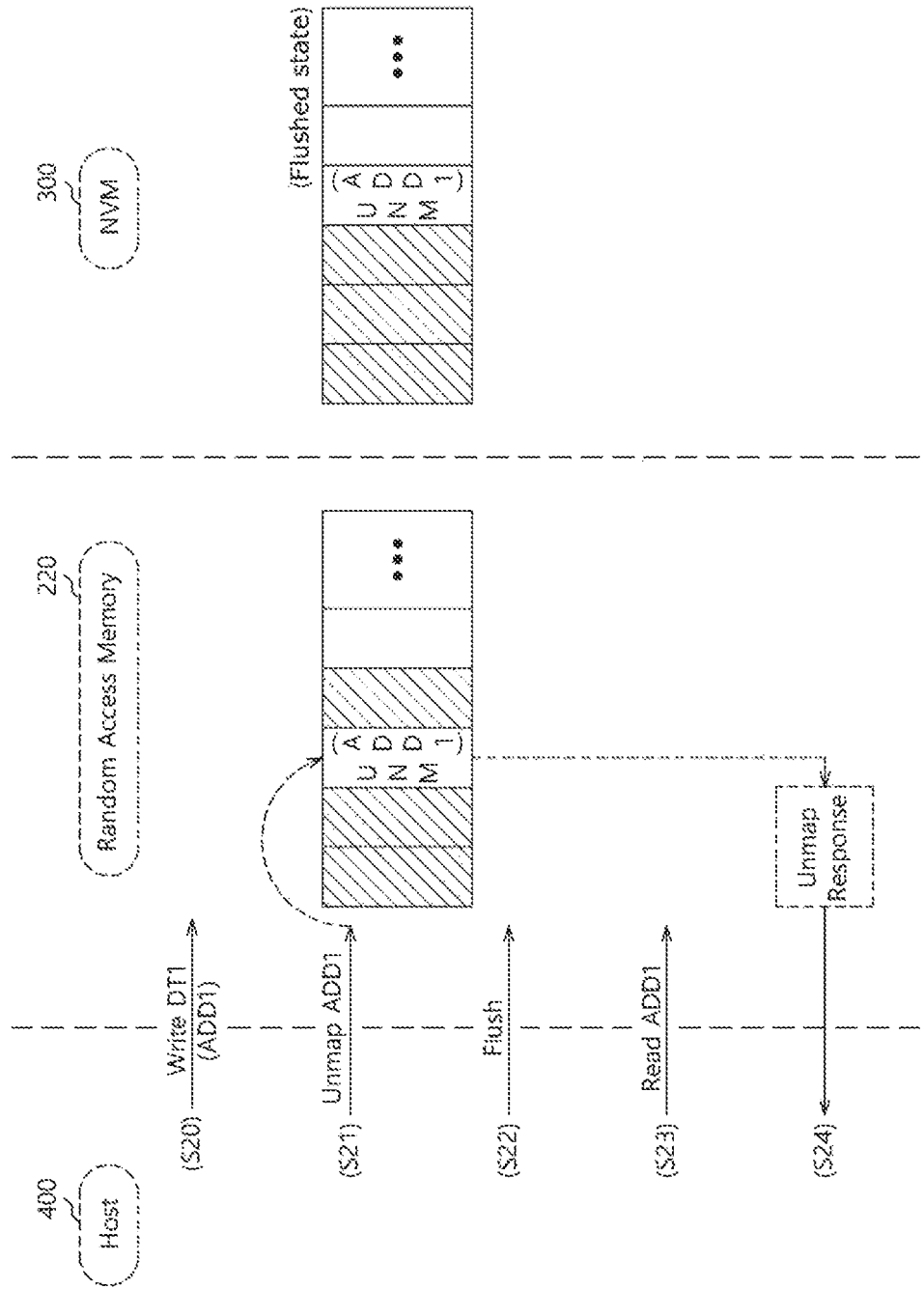
Figure 6:
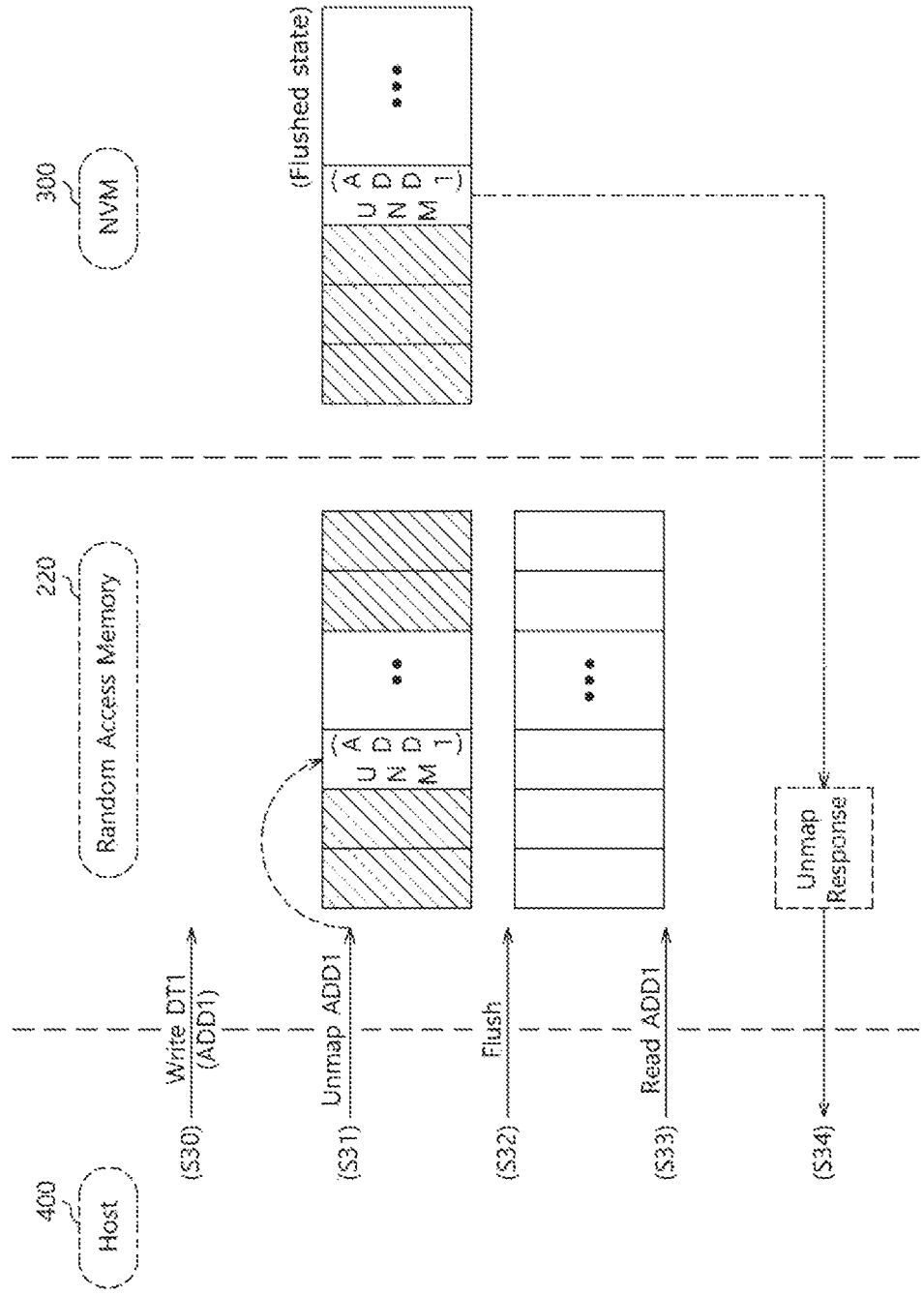

FIGS. 4 to 6 diagrams describing processes in which the memory system in accordance with the embodiment outputs a response to a request received from a host device. In FIGS. 4 to 6, respective steps S10 to S13, S20 to S24, and S30 to S34 may be performed according to a time series. The memory system 100 in accordance with the embodiment will be described below with reference to FIG. 1 and FIGS. 4 to 6.

The memory system 100 in accordance with the embodiment may include the nonvolatile memory device 300 which includes memory units; the random access memory 220 which is configured to store a flag information UNM indicating that the address of a memory unit is unmapped; and the control unit 210 which is configured to transmit to the host device 400, when a read request is received from the host device 400, a response corresponding to the read request.

The control unit 210 may transmit an unmap response to the host device 400 by referring to the flag information UNM, when a read request for an unmap address is received from the host device 400.

Referring to FIG. 4, the controller 200 may receive a write request for first data DT1 from the host device 400 at step S10. It is assumed that, in response to the write request received from the host device 400, the controller 200 may output a write command for the first data DT1 to the nonvolatile memory device 300 and the first data DT1 is stored in a page corresponding to a first address ADD1 among the pages of the nonvolatile memory device 300 (not shown).

Thereafter, the controller 200 may receive an unmap request for the first address ADD1 from the host device 400 at step S11. In response to the unmap request, the control unit 210 may control the random access memory 220 to store a flag information UNM.

After the unmap flag information UNM for the first address ADD1 is stored in the random access memory 220, when a read request for the first data DT1 stored in the page of the nonvolatile memory device 300 corresponding to the first address ADD1 is received from the host device 400 at step S12, the control unit 210 may transmit an unmap response to the host device 400, by referring to the flag information UNM stored in the random access memory 220. In other words, the controller 200 may not issue a separate command to the nonvolatile memory device 300, and may transmit the unmap response to the host device 400, by referring to the flag information UNM stored in the random access memory 220 at step S13.

In the memory system 100 in accordance with the embodiment, the flag information UNM for the unmap address may be stored in the random access memory 220, and may be flushed to the nonvolatile memory device 300 in the case where a first condition is satisfied. In this regard, FIG. 4 illustrates an example of the case where the read request for the unmap address is received from the host device 400 at a time when the flag information UNM is not yet flushed to the nonvolatile memory device 300.

Referring to FIG. 5, the controller 200 may receive a write request for first data DT1 from the host device 400 at step S20. It is assumed that, in response to the write request received from the host device 400, the controller 200 may output a write command for the first data DT1 to the nonvolatile memory device 300 and the first data DT1 is stored in a page corresponding to a first address ADD1 among the pages of the nonvolatile memory device 300 (not shown).

Thereafter, the controller 200 may receive an unmap request for the first address ADD1 from the host device 400 at step S21. In response to the unmap request, the control unit 210 may control the random access memory 220 to store a flag information UNM.

After the flag information UNM is stored in the random access memory 220, when a first condition is satisfied, the control unit 210 may control the flag information UNM to be flushed from the random access memory 220 to the nonvolatile memory device 300. According to FIG. 5, the first condition is exemplified as receiving the flush request from the host device 400 at step S22. However, the first condition is not limited thereto. For example, the first condition may be a condition in which the random access memory 220 is full. In other words, the first condition may be set and changed at any time in the present embodiment.

After the flag information UNM is flushed from the random access memory 220 to the nonvolatile memory device 300, when a read request for the first data DT1 stored in the page of the nonvolatile memory device 300 corresponding to the first address ADD1 is received from the host device 400 at step S23, the control unit 210 may transmit an unmap response to the host device 400, by referring to the flag information UNM stored in the random access memory 220. In other words, the controller 200 may not issue a separate command to the nonvolatile memory device 300, and may transmit the unmap response to the host device 400, by referring to the flag information UNM stored in the random access memory 220 at step S24.

In the memory system 100 in accordance with the embodiment, the flag information UNM for the unmap address may be stored in the random access memory 220, and may be flushed from the random access memory 220 to the nonvolatile memory device 300 in the case where a first condition is satisfied. In this regard, FIG. 5 illustrates an example of the memory system 100 capable of transmitting the unmap response to the host device 400 by referring to the flag information UNM stored in the random access memory 220 even in the case where the read request for the unmap address is received from the host device 400 after the flag information UNM is flushed from the random access memory 220 to the nonvolatile memory device 300.

Referring to FIG. 6, the controller 200 may receive a write request for first data DT1 from the host device 400 at step S30. It is assumed that, in response to the write request received from the host device 400, the controller 200 may output a write command for the first data DT1 to the nonvolatile memory device 300 and the first data DT1 is stored in a page corresponding to a first address ADD1 among the pages of the nonvolatile memory device 300 (not shown).

Thereafter, the controller 200 may receive an unmap request for the first address ADD1 from the host device 400 at step S31. In response to the unmap request, the control unit 210 may control the random access memory 220 to store a flag information UNM.

After the flag information UNM is stored in the random access memory 220, when a first condition is satisfied, the control unit 210 may control the flag information UNM to be flushed from the random access memory 220 to the nonvolatile memory device 300. According to FIG. 6, the first condition is exemplified as receiving the flush request from the host device 400 at step S32. However, the first condition is not limited thereto. For example, the first condition may be a condition in which the random access memory 220 is full. In other words, the first condition may be set and changed at any time in the present embodiment.

When a second condition is satisfied, the control unit 210 may control all data including the flag information UNM to be erased from the random access memory 220. The second condition may be that the random access memory 220 is full, but is not limited thereto. The second condition may be set and changed at any time.

After the flag information UNM is erased from the random access memory 220 as the second condition is satisfied, when a read request for the first data DT1 stored in the page of the nonvolatile memory device 300 corresponding to the first address ADD1 is received from the host device 400 at step S33, the controller 200 may output to the nonvolatile memory device 300 a read command (not shown) for the data stored in location of the first address ADD1 of the nonvolatile memory device 300.

In response to the read command from the controller 200, the nonvolatile memory device 300 may transmit the flag information UNM for the first address ADD1 to the controller 200 (not shown) and the control unit 210 may control an unmap response to be transmitted to the host device 400, by referring to the flag information UNM read from the nonvolatile memory device 300 at step S34.

That is, in the memory system 100 in accordance with the embodiment, the flag information UNM for the unmap address may be stored in the random access memory 220, and may be erased from the random access memory 220 in the case where the second condition is satisfied while the flag information UNM is flushed and stored into the nonvolatile memory device 300. The controller 200 of the memory system 100 may transmit the unmap response to the host device 400 by referring to the flag information UNM read from the nonvolatile memory device 300 in the case where the read request for the unmap address is received from the host device 400 at after the flag information UNM is flushed to the nonvolatile memory device 300 and the flag information UNM stored in the random access memory 220 is erased.

Figure 7:
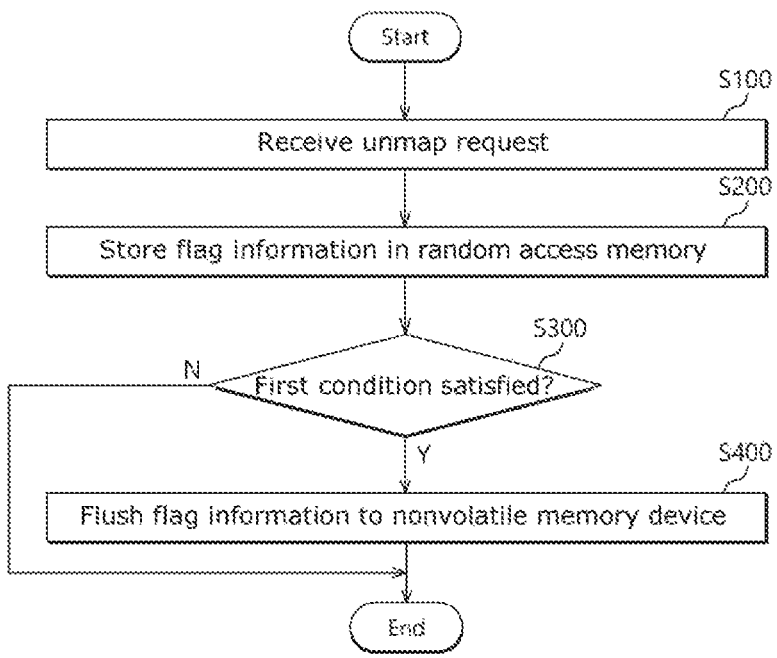
FIG. 7 is a flow chart describing a method for operating a memory system in accordance with an embodiment.

FIG. 7 is a flow chart describing a method for operating a memory system in accordance with an embodiment. Referring to FIG. 7, the method for operating a memory system in accordance with the embodiment may include a step of receiving an unmap request from a host device at step S100; a step of storing a flag information indicating that an unmap address as the target of the unmap request is unmapped, in a random access memory at step S200; determining whether a first condition is satisfied at step S300; and controlling the flag information to be flushed to a nonvolatile memory device, by a control unit, when the first condition is satisfied at step S400. When the first condition is not satisfied, the flag information may be not flushed to the nonvolatile memory device.

As described above, the first condition may be a condition in which a flush request is received from the host device. However, it is to be noted that the present embodiment is not limited thereto. For example, the first condition may be a condition in which the random access memory is full. That is, the first condition may be set and changed at any time.

Figure 8:
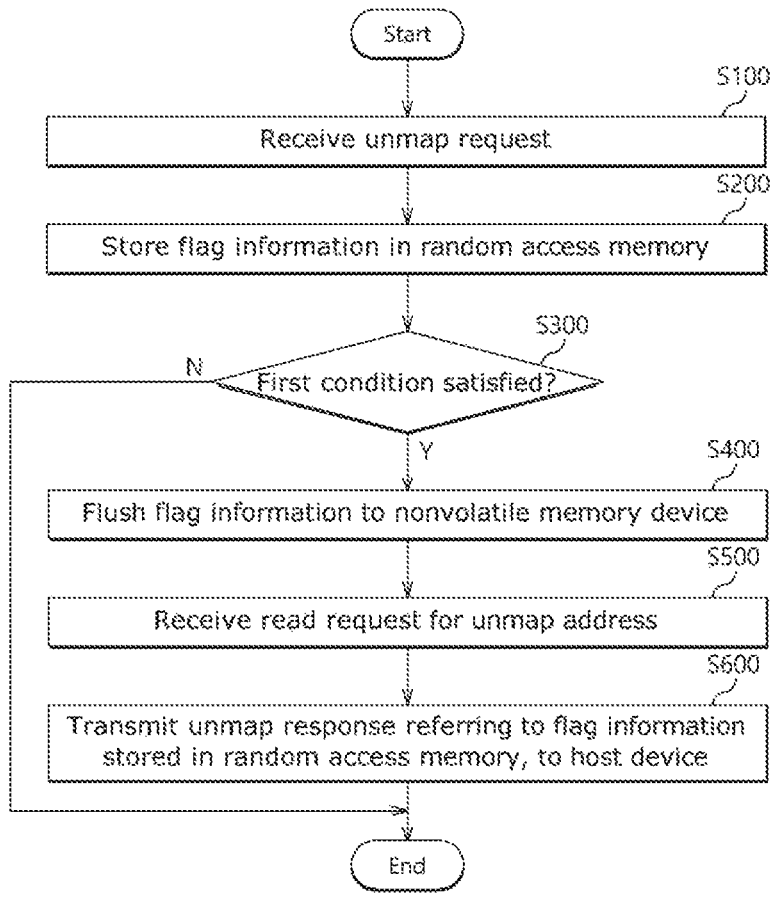
FIG. 8 is a flow chart describing a method for operating a memory system in accordance with an embodiment.

FIG. 8 is a flow chart describing a method for operating a memory system in accordance with an embodiment. Referring to FIG. 8, the method for operating a memory system in accordance with the embodiment may further include a step of receiving a read request for the unmap address from the host device at step S500; and a step of controlling, by the control unit, an unmap response to be transmitted to the host device, by referring to the flag information stored in the random access memory 220 at step S600.

Figure 9:
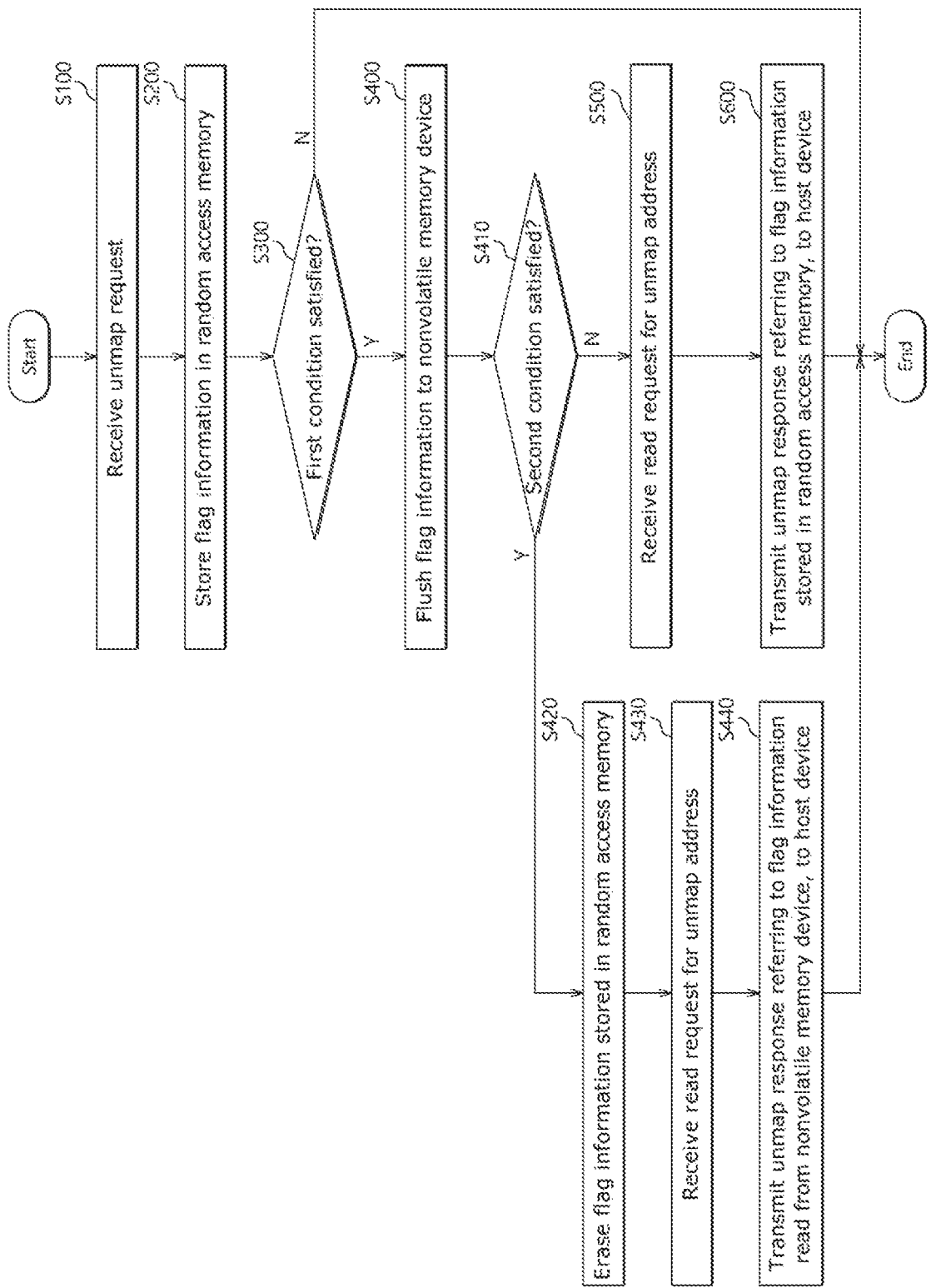
FIG. 9 is a flow chart describing a method for operating a memory system in accordance with an embodiment.

FIG. 9 is a flow chart describing a method for operating a memory system in accordance with an embodiment. Referring to FIG. 9, the method for operating a memory system in accordance with the embodiment may further include determining whether a second condition is satisfied at step S410; and controlling the flag information to be erased from the random access memory, when the second condition is satisfied, at step S420; and steps of controlling, by the control unit, an unmap response to be transmitted, by referring to the flag information read from the nonvolatile memory device, when a read request is received after the flag information is erased from the random access memory at steps S430 and S440.

According to the embodiment, the second condition may be a condition in which the random access memory is full, but the present embodiment is not limited thereto. That is, the second condition may be set and changed at any time.

Figure 10:
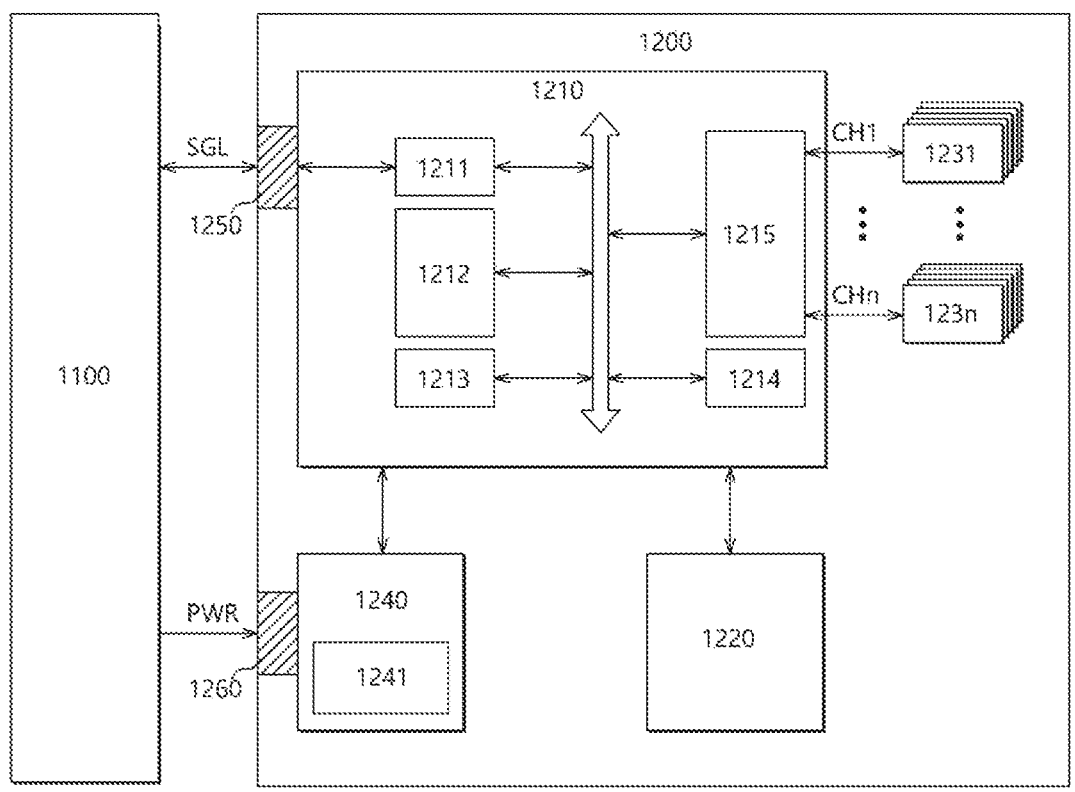
FIG. 10 is a diagram illustrating an example of a data processing system including a solid state drive (SSD) in accordance with an embodiment.

FIG. 10 is a diagram illustrating an example of a data processing system including a solid state drive (SSD) in accordance with an embodiment. Referring to FIG. 10, a data processing system 1000 may include a host device 1100 and an SSD 1200.

The SSD 1200 may include a controller 1210, a buffer memory device 1220, nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The control unit 1212 may analyze and process a signal SGL inputted from the host device 1100. The control unit 1212 may control operations of internal function blocks according to a firmware or a software for driving the SSD 1200. The random access memory 1213 may be used as a working memory for driving such a firmware or software.

The error correction code (ECC) unit 1214 may generate the parity data of data to be transmitted to the nonvolatile memory devices 1231 to 123n. The generated parity data may be stored together with the data in the nonvolatile memory devices 1231 to 123n. The error correction code (ECC) unit 1214 may detect an error of the data read out from the nonvolatile memory devices 1231 to 123n, based on the parity data. If a detected error is within a correctable range, the error correction code (ECC) unit 1214 may correct the detected error.

The memory interface unit 1215 may provide control signals such as commands and addresses to the nonvolatile memory devices 1231 to 123n, according to control of the control unit 1212. Moreover, the memory interface unit 1215 may exchange data with the nonvolatile memory devices 1231 to 123n, according to control of the control unit 1212. For example, the memory interface unit 1215 may provide the data stored in the buffer memory device 1220, to the nonvolatile memory devices 1231 to 123n, or provide the data read out from the nonvolatile memory devices 1231 to 123n, to the buffer memory device 1220.

The buffer memory device 1220 may temporarily store data to be stored in the nonvolatile memory devices 1231 to 123n. Further, the buffer memory device 1220 may temporarily store the data read out from the nonvolatile memory devices 1231 to 123n. The data temporarily stored in the buffer memory device 1220 may be transmitted to the host device 1100 or the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 11:
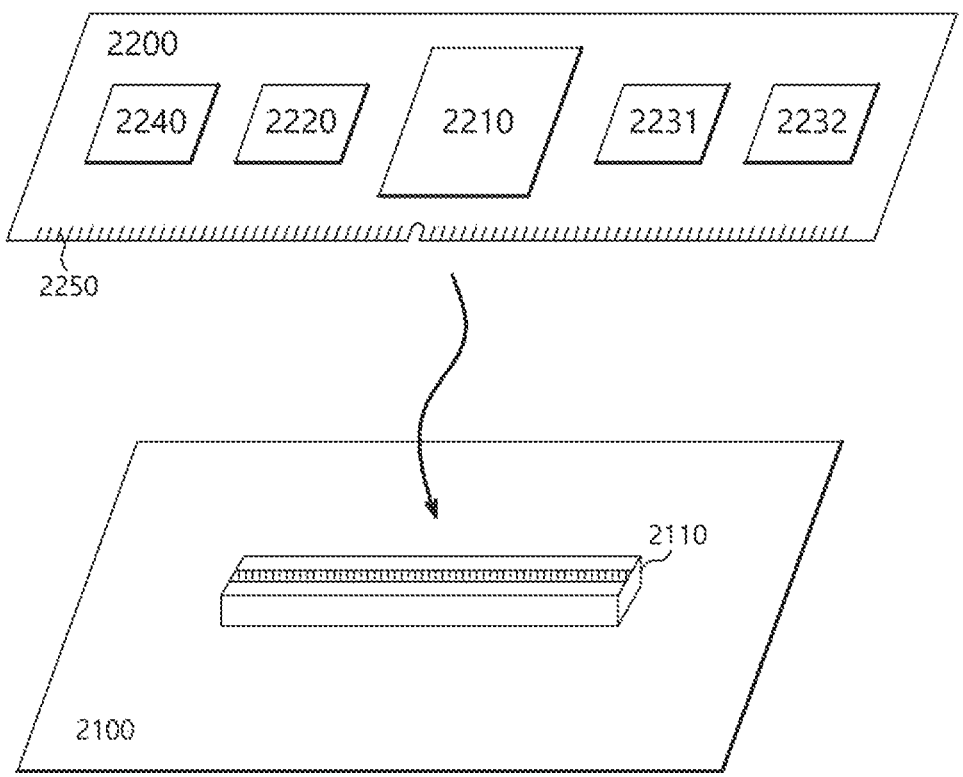
FIG. 11 is a diagram illustrating an example of a data processing system including a memory system in accordance with an embodiment.

FIG. 11 is a diagram illustrating an example of a data processing system including a memory system in accordance with an embodiment. Referring to FIG. 11, a data processing system 2000 may include a host device 2100 and a memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control the general operations of the memory system 2200. The controller 2210 may be configured in the same manner as the controller 1210 shown in FIG. 10.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as the storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be constructed into various types depending on an interface scheme between the host device 2100 and the memory system 2200. The connection terminal 2250 may be disposed on any one side of the memory system 2200.

Figure 12:
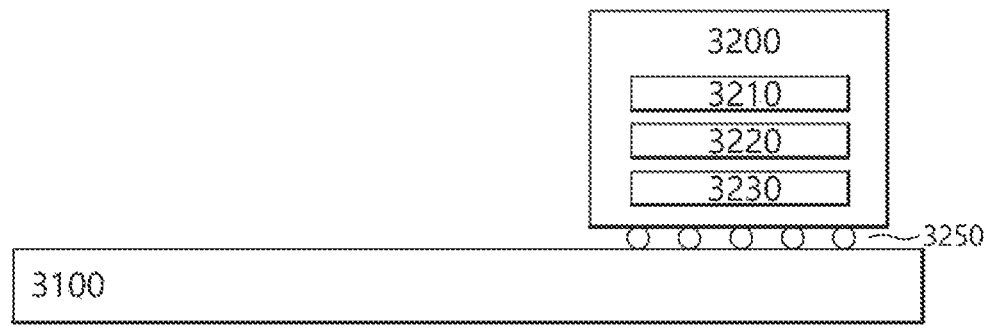
FIG. 12 is a diagram illustrating an example of a data processing system including a memory system in accordance with an embodiment.

FIG. 12 is a diagram illustrating an example of a data processing system including a memory system in accordance with an embodiment. Referring to FIG. 12, a data processing system 3000 may include a host device 3100 and a memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control the general operations of the memory system 3200. The controller 3210 may be configured in the same manner as the controller 1210 shown in FIG. 10.

The buffer memory device 3220 may temporarily store data to be stored in the nonvolatile memory device 3230. Further, the buffer memory device 3220 may temporarily store the data read out from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 13:
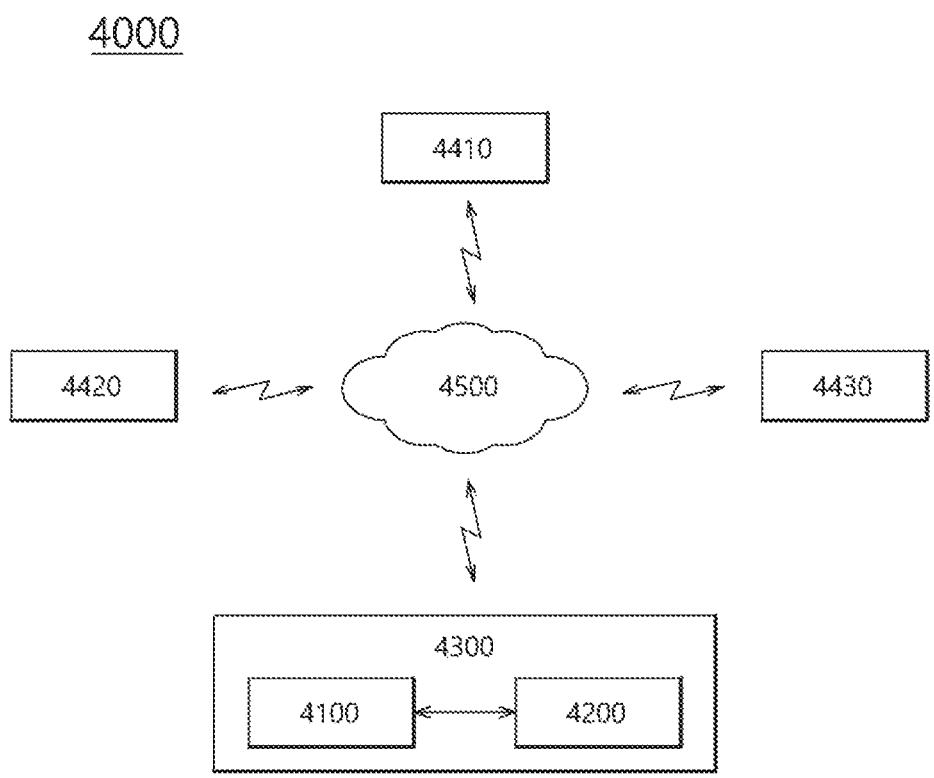
FIG. 13 is a diagram illustrating an example of a network system including a memory system in accordance with an embodiment.

FIG. 13 is a diagram illustrating an example of a network system including a memory system in accordance with an embodiment. Referring to FIG. 13, a network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 of FIG. 1, the SSD 1200 of FIG. 10, the memory system 2200 of FIG. 11 or the memory system 3200 of FIG. 12.

Figure 14:
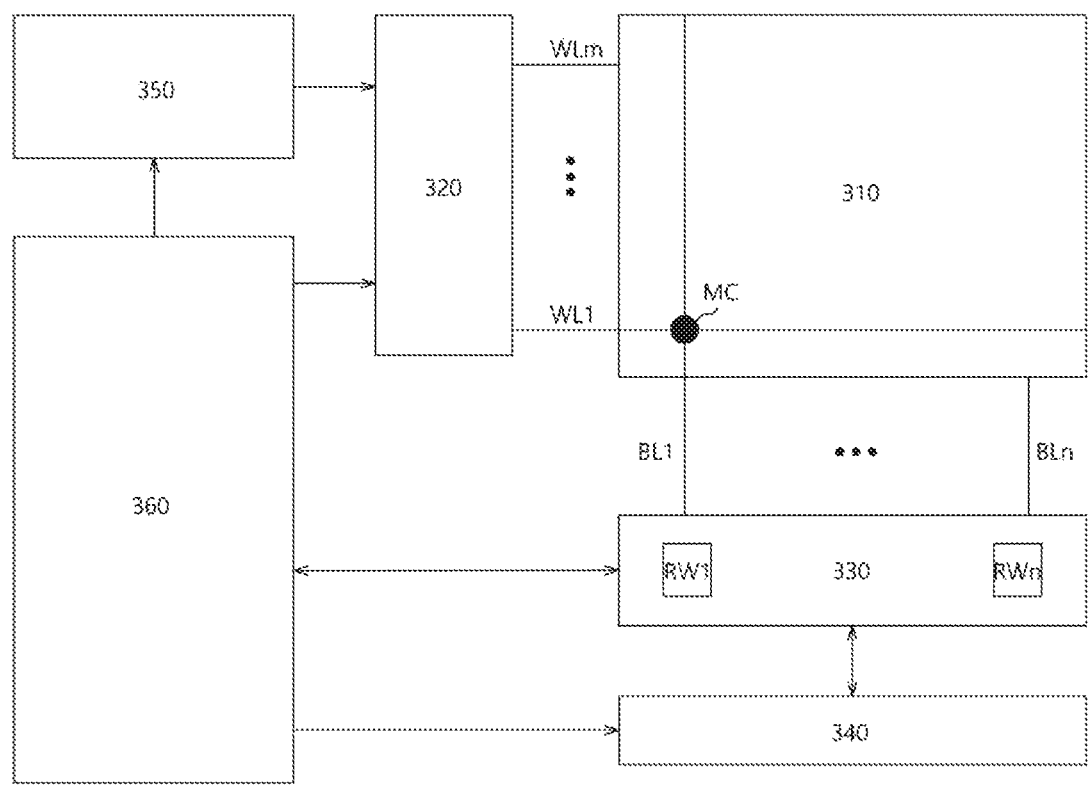
FIG. 14 is a block diagram illustrating an example of a nonvolatile memory device included in a memory system in accordance with an embodiment.

FIG. 14 is a block diagram illustrating an example of a nonvolatile memory device included in a memory system in accordance with an embodiment. Referring to FIG. 14, a nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to the control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to the control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines (or data input/output buffers), based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For still another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control the read, write and erase operations of the nonvolatile memory device 300.

The descriptions for the above-described system may be applied to the methods in accordance with the embodiments of the present disclosure. Therefore, descriptions the same as the descriptions for the above-described system are omitted in the methods.

While various embodiments have been described above, it will be understood to those skilled in the art that the embodiments described are examples only. Accordingly, the memory system and the operating method thereof described herein should not be limited based on the described embodiments.

What is claimed is:

1. A memory system comprising:
   a nonvolatile memory device;
   a random access memory (RAM) configured to store flag information indicating whether a corresponding address is unmapped; and
   a controller configured to store the flag information for an unmap target address in the RAM in response to an unmap request received from a host device and flush the flag information from the RAM to the nonvolatile memory device depending on whether a predetermined condition is satisfied.

2. The memory system according to claim 1, wherein the controller flushes the flag information from the RAM to the nonvolatile memory device when a flush request is received from the host device.

3. The memory system according to claim 1, wherein the controller flushes the flag information from the RAM to the nonvolatile memory device when the RAM is full.

4. The memory system according to claim 1, wherein the controller transmits an unmap response to the host device by referring to the flag information stored in the RAM, when a read request for the unmap target address is received from the host device.

5. The memory system according to claim 1, wherein the controller erases the flag information from the RAM when the RAM is full.

6. The memory system according to claim 5, wherein the controller erases the flag information from the RAM depending on whether the flag information has been flushed from the RAM to the nonvolatile memory device.

7. A method for operating a memory system, the method comprising:
   storing flag information indicating that an unmap target address is unmapped, in a random access memory (RAM) in response to an unmap request received from a host device; and
   flushing the flag information from the RAM to a nonvolatile memory device when a predetermined condition is satisfied.

8. The method according to claim 7, wherein the flushing of the flag information is performed when a flush request is received from the host device.

9. The method according to claim 7, wherein the flushing of the flag information is performed when the RAM is full.

10. The method according to claim 7, further comprising:
    receiving a read request for the unmap target address from the host device; and
    transmitting an unmap response to the host device by referring to the flag information corresponding to the unmap target address stored in the RAM.

11. The method according to claim 7, further comprising:
    erasing the flag information from the RAM when the RAM is full.

12. The method according to claim 11, wherein the erasing of the flag information from the RAM includes determining whether the flag information has been flushed from the RAM to the nonvolatile memory device.

13. A memory system comprising:
    a nonvolatile memory device;
    a random access memory (RAM); and
    a controller configured to:
    receive an unmap request from a host device;
    store flag information indicating that an address corresponding to the unmap request is unmapped, in the RAM; and
    flush the flag information from the RAM to the nonvolatile memory device depending on whether a certain condition is satisfied.

14. The memory system according to claim 13, wherein the controller flushes the flag information from the RAM to the nonvolatile memory device when a flush request is received from the host device.

15. The memory system according to claim 13, wherein the controller flushes the flag information from the RAM to the nonvolatile memory device when the RAM is full.

16. The memory system according to claim 13, wherein the controller transmits an unmap response to the host device by referring to the flag information stored in the RAM, when a read request for the address is received from the host device.

17. The memory system according to claim 13, wherein the controller erases the flag information from the RAM when the RAM is full.

18. The memory system according to claim 17, wherein the controller erases the flag information from the RAM depending on whether the flag information has been flushed from the RAM to the nonvolatile memory device.

* * * * *